Dec. 8, 1925.
C. G. ROSS
1,564,278
BUMPER FOR MOTOR VEHICLES
Filed April 21, 1924
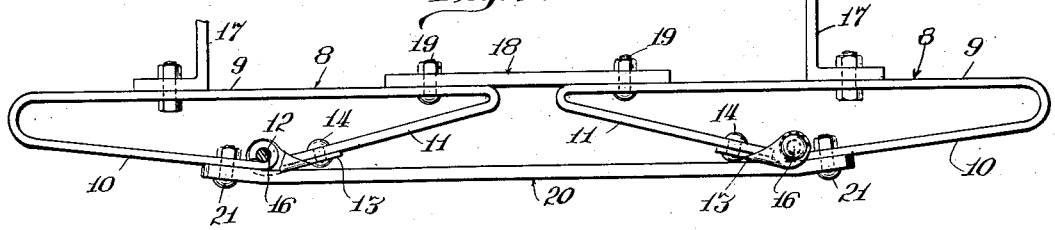
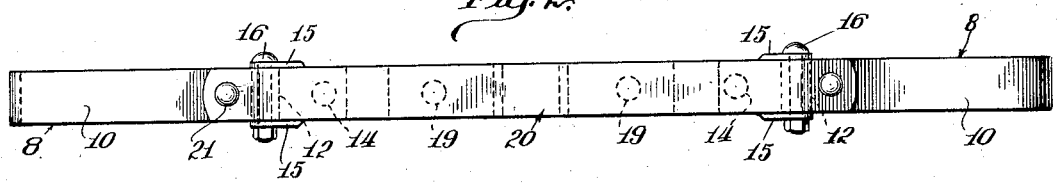
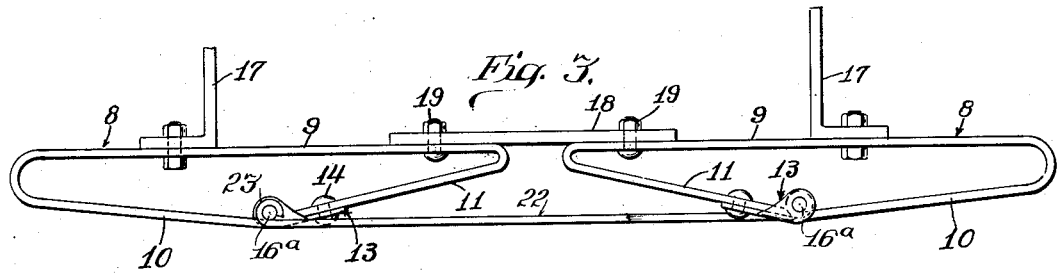
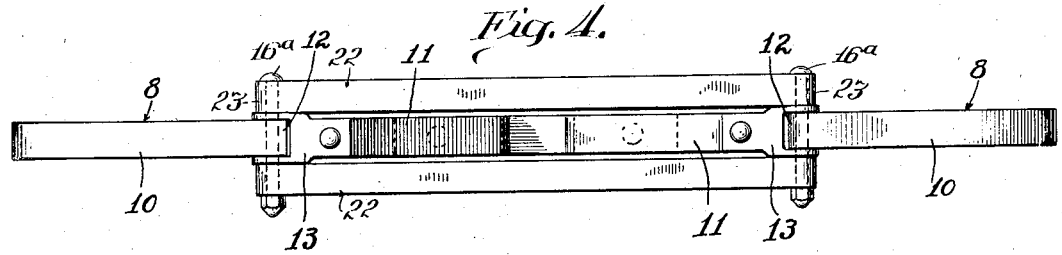
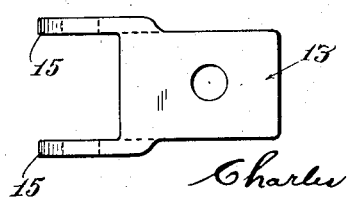
Inventor
Charles G. Ross
By Leslie W. Fricke
Attorney Patented Dec. 8, 1925.

1,564,278

UNITED STATES PATENT OFFICE.

CHARLES G. ROSS, OF CHICAGO, ILLINOIS, ASSIGNOR OF ONE-HALF TO WILLIAM L. ROSS, OF CHICAGO, ILLINOIS.

BUMPER FOR MOTOR VEHICLES.

Application filed April 21, 1924. Serial No. 707,960.

*To all whom it may concern:*

Be it known that I, CHARLES G. ROSS, a citizen of the United States, residing at Chicago, in the county of Cook and State of Illinois, have invented certain new and useful Improvements in Bumpers for Motor Vehicles, of which the following is a specification.

My invention relates to improvements in bumpers for vehicles of various kinds and particularly for automobiles and trucks.

One of the objects of my invention is the provision of a bumper wherein the several parts are so arranged and articulated that they will be able to absorb all ordinary shocks due to collision without becoming damaged and without transmitting the shocks to the vehicle to which the bumper is attached.

A further object of my invention is the provision of a bumper consisting of independent buffer means at each end which are preferably connected together by suitable impact members and which are so arranged and constructed that any shocks imparted thereto will be readily absorbed and the fenders and parts of the vehicle adjacent thereto will be protected.

A further object of my invention is the provision of a bumper which will be light in weight, economical to manufacture, strong and durable and so constructed that, should one of its parts be damaged in a collision, that part may be readily replaced without the necessity of replacing the undamaged parts.

In its preferred form my invention contemplates the provision of a pair of spaced buffer means, each of which comprises a resilient bar bent into the form of a triangular loop with its extremities pivotally connected, in combination with a pair of transversely extending impact members, one positioned in a plane above and the other in a plane below the aforesaid buffer means, the extremities of the respective impact members preferably being pivotally connected to the buffer means; and, it is another object of my invention to provide buffer means of like construction so that they may be made from the same dies or with the same tools, and impact members also of like construction so that they also may be made from the same die or with the same tools, whereby the initial cost of dies, tools, etc., for the manufacture of the parts is minimized, the assembling of the parts facilitated and the necessity of a dealer carrying a large stock of extra repair parts on hand is obviated.

The invention consists in the novel constructions, arrangements and devices to be hereinafter described and claimed for carrying out the above stated objects and such other objects as will appear from the following description of certain preferred embodiments illustrated in the accompanying drawings, wherein—

Fig. 1 is a plan view of one form of bumper embodying the principles of my invention;

Fig. 2 is a front elevational view of the bumper shown in Fig. 1;

Fig. 3 is a plan view of a bumper also embodying the principles of my invention but of slightly modified construction;

Fig. 4 is a front elevational view of the bumper shown in Fig. 3;

Fig. 5 is a side elevational view, on an enlarged scale, of one of the connecting members employed in the bumpers; and Fig. 6 is a plan view, also on an enlarged scale, of the connecting member shown in Fig. 5.

Like characters of reference designate like parts in the several views.

Referring first to Figs. 1 and 2, the bumper therein shown includes two spaced buffer means, designated generally by the reference character 8, each consisting of a resilient bar formed so as to provide a transverse portion 9, the ends of the bar being bent forwardly and then back to provide angularly disposed portions 10 and 11. The extremity of one of the portions, in the present embodiment the portion 10, is provided with an eye 12. A connecting member 13, best shown in Figs. 5 and 6, is secured to the extremity of the other portion, which, in the embodiment herein shown, is the portion 11, by any suitable means, for example, a rivet 14. The connecting member 13 is provided with spaced perforated ears 15 which straddle the eye 12. A pintle member 16 which may be in the form of a bolt is passed through the top ear 15, the eye 12 and then the bottom ear 15 thereby pivotally connecting the extremities or the adjacent ends of the portions 10 and 11. The buffer means 8 will ordinarily be fixed to the ends of the respective longitudinally extending channel members of the chassis frame (not shown) which may be done by any suitable means, for example, L-shaped bracket members 17. The buffer means on one side are preferably rigidly fastened together by means such as a transversely extending connecting bar 18 having its extremities fastened by bolts 19 to the intermediate portions 9 of the respective buffer means. The buffer means on the other side are connected by a transversely extending impact bar 20, its extremities, in the present embodiment, being attached to the angularly disposed portions 10 of the respective buffer means by bolts 21.

The bumper shown in Figs. 3 and 4 is provided with two spaced impact members 22, the extremities of which are pivotally connected to the respective buffer means, otherwise this bumper being similar in construction to that first described. The impact members 22 are arranged in a common vertical plane and so that one will be in a plane above and the other in a plane below the buffer means. Each impact member is provided on each of its extremities with an eye 23. Each pintle member 16ª is long enough to extend through the eye of the upper impact member 22, the top ear of the connecting member 13, the eye 12 of the buffer portion 10, the bottom ear of the connecting member 13 and then through the eye of the lower impact member 22.

It will be noted that the two buffer means are alike in construction, hence they may be made from the same die or with the same tools; likewise, in that form of my invention shown in Figs. 3 and 4, the impact members 22 are alike in construction. The manufacture of parts identical in construction keeps down the initial investment for dies, tools, etc., facilities assembling of the parts forming the bumper and reduces the number of repair parts that a dealer has to carry in stock. Furthermore, should one of the buffer means or the impact means become damaged for any reason, it is unnecessary to discard the entire bumper, as the damaged part may be readily replaced independent of the other parts. It will further be noted that the impact members and the buffing means, also the connecting bar 18 may all be made of stock of the same cross-section which is a considerable advantage in the manufacture of an article of this kind on a heavy production basis.

It will be noted that, in both forms of my invention, the buffer means interposed between the impact member or members and the vehicle consists of a resilient bar which is formed into a loop of triangular formation and which has its ends pivotally connected, thus providing a construction in which the angularly disposed portions 10 and 11 have great capacity for flexing. The transverse portions 9 of the two buffer means and the connecting bar 18 in effect constitute a transversely extending relatively rigid unitary support for the two sets of flexible, pivotally connected angularly disposed portions 10 and 11 which in turn carry or support the impact means. A shock is not entirely borne by any one of the angularly disposed portions 10 and 11 but is to a very considerable extent uniformly distributed to and absorbed by the four angularly disposed portions. The construction and the arrangement of the parts of the bumper is such that the bumper has great capacity for withstanding and absorbing shock without transmitting its effect to the vehicle; nevertheless the parts of the bumper by reason of their peculiar arrangement may be relatively light in weight, which is very desirable both from the standpoint of the manufacturer and the user. The buffer means 8 in themselves have great capacity for absorbing shock and, therefore, effectively prevent the respective fenders and parts of the vehicle adjacent thereto from being damaged. In that form of my invention shown in Figs. 3 and 4, the spaced impact members 22 provide a relatively wide impact area and thus prevent the bumper on another vehicle from passing thereover or thereunder, as so frequently happens with bumpers of the single impact bar type.

I do not intend to limit my invention to the details of constructions, arrangements and devices show and described except only in so far as certain of the appended claims are specifically so limited, as it will be obvious to those skilled in the art that modifications may be made without departing from the spirit of my invention.

I claim:

1. A bumper of the class described comprising two spaced buffer means each consisting of a resilient bar formed into a loop and having its ends pivotally connected, and impact means connected to said respective buffer means.

2. A bumper of the class described comprising two spaced buffer means each consisting of a resilient bar formed into a loop and having its ends pivotally connected, connecting means attached to said respective buffer means at one side, and impact means connected to said respective buffer means at the other side.

3. A bumper of the class described comprising two spaced buffer means each consisting of a resilient bar formed into a loop of triangular formation and having its ends connected, connecting means attached to said respective buffer means at one side and impact means connected to said respective buffer means at the other side.

4. A bumper of the class described comprising two spaced buffer means each consisting of a resilient bar formed into a loop of triangular formation and having its ends pivotally connected, and impact means connected to said respective buffer means.

5. A bumper of the class described comprising two spaced buffer means each consisting of a resilient bar formed into a loop of triangle formation and having its ends pivotally connected, connecting means attached to said respective buffer means at one side and impact means connected to said respective buffer means at the other side.

6. A bumper of the class described comprising two spaced buffer means each consisting of a resilient bar formed into a loop of triangular formation and having its ends pivotally connected, and impact means connected to said respective buffer means adjacent their respective pivotal connections.

7. A bumper of the class described comprising two spaced buffer means each consisting of a resilient bar formed into a loop of triangular formation and having its ends pivotally connected, connecting means attached to said respective buffer means at one side, and impact means connected to said respective buffer means at the other side and adjacent their respective pivotal connections.

8. A bumper of the class described comprising two spaced buffer means each consisting of a resilient bar formed into a loop and having its ends connected, a pair of spaced impact members and means connecting each of said members to said respective buffer means.

9. A bumper of the class described comprising two spaced buffer means each consisting of a resilient bar formed into a loop and having its ends connected, connecting means attached to said respective buffer means at one side, a pair of spaced impact members and means connecting each of said members to said respective buffer means at the other side.

10. A bumper of the class described comprising two spaced buffer means each consisting of a resilient bar formed into a loop and having its ends pivotally connected, a pair of spaced impact members and means connecting each of said members to said respective buffer means.

11. A bumper of the class described comprising two spaced buffer means each consisting of a resilient bar formed into a loop and having its ends pivotally connected, connecting means attached to said respective buffer means at one side, a pair of spaced impact members and means connecting each of said members to said respective buffer means at the other side.

12. A bumper of the class described comprising two spaced buffer means each consisting of a resilient bar formed into a loop of triangular formation and having its ends connected, a pair of spaced impact members and means connecting each of said members to said respective buffer means.

13. A bumper of the class described comprising two spaced buffer means each consisting of a resilient bar formed into a loop of triangular formation and having its ends connected, connecting means attached to said respective buffer means at one side, a pair of spaced impact members and means connecting each of said members to said respective buffer means at the other side.

14. A bumper of the class described comprising two spaced buffer means each consisting of a resilient bar formed into a loop of triangular formation and having its ends pivotally connected, a pair of spaced impact members and means connecting each of said members to said respective buffer means.

15. A bumper of the class described comprising two spaced buffer means each consisting of a resilient bar formed into a loop of triangular formation and having its ends pivotally connected, connecting means attached to said respective buffer means at one side, a pair of spaced impact members and means connecting each of said members to said respective buffer means at the other side.

16. A bumper of the class described comprising two spaced buffer means each consisting of a resilient bar formed into a loop of triangular formation and having its ends pivotally connected, a pair of spaced impact members and means connecting each of said members to said respective buffer means adjacent their respective pivotal connections.

17. A bumper of the class described comprising two spaced buffer means each consisting of a resilient bar formed into a loop of triangular formation and having its ends pivotally connected, connecting means attached to said respective buffer means at one side, a pair of spaced impact members and means connecting each of said members to said respective buffer means at the other side and adjacent their respective pivotal connections.

18. A bumper of the class described comprising two spaced buffer means each consisting of a resilient bar formed into a loop, means pivotally connecting the adjacent ends of said respective bars and impact means having its respective ends pivotally connected to said second named means.

19. A bumper of the class described comprising two spaced buffer means each consisting of a resilient bar formed into a loop, means pivotally connecting the adjacent ends of said respective bars, impact means on one side of said buffer means and having its respective ends pivotally connected to said second named means, and connecting means attached to said respective buffer means at the other side.

20. A bumper of the class described comprising two spaced buffer means each consisting of a resilient bar formed into a loop of triangular formation, means pivotally connecting the adjacent ends of said respective bars, and impact means having its respective ends pivotally connected to said second named means.

21. A bumper of the class described comprising two spaced buffer means each consisting af a resilient bar formed into a loop of triangular formation, means pivotally connecting the adjacent ends of said respective bars, impact means on one side of said buffer means and having its respective ends pivotally connected to said second named means, and connecting means attached to said respective buffer means at the other side.

22. A bumper of the class described comprising two spaced buffer means each consisting of a resilient bar formed into a loop the respective ends of which are provided with eyes, two impact members disposed, respectively, in the plane above and the plane below said buffer means, each of said impact members being provided with eyes on its extremities, and pintle members extending, respectively, through the eyes of said resilient bars and said impact members.

23. A bumper of the class described comprising two spaced buffer means each consisting of a resilient bar formed into a loop the respective ends of which are provided with eyes, two impact members disposed at one side of said buffer means, one of said members being in the plane above and the other in the plane below said buffer means, each of said impact members being provided with eyes on its extremities, pintle members extending, respectively, through the eyes of said resilient bars and said impact members, and connecting means attached to said respective buffer means at the other side.

24. A bumper of the class described comprising two spaced buffer means each consisting of a resilient bar formed into a loop of triangular formation the respective ends of which are provided with eyes, two impact members disposed, respectively, in the plane above and the plane below said buffer means, each of said impact members being provided with eyes on its extremities, and pintle members extending, respectively, through the eyes of said resilient bars and said impact members.

25. A bumper of the class described comprising two spaced buffer means each consisting of a resilient bar formed into a loop of triangular formation the respective ends of which are provided with eyes, two impact members disposed at on side of said buffer means, one of said members being in the plane above and the other in the plane below said buffer means, each of said impact members being provided with eyes on its extremities, pintle members extending, respectively, through the eyes of said resilient bars and said impact members, and connecting means attached to said respective buffer means at the other side.

26. In a bumper construction of the class described, a resilient bar formed into a loop of triangular formation and having its ends pivotally connected.

27. In a bumper construction of the class described, a resilient bar formed into a loop of triangular formation and having its ends terminating at the apex thereof, the ends of said bar being pivotally connected.

CHARLES G. ROSS.